L. W. GREVE.
AIR VALVE.
APPLICATION FILED MAY 23, 1918.
1,425,643.
Patented Aug. 15, 1922.
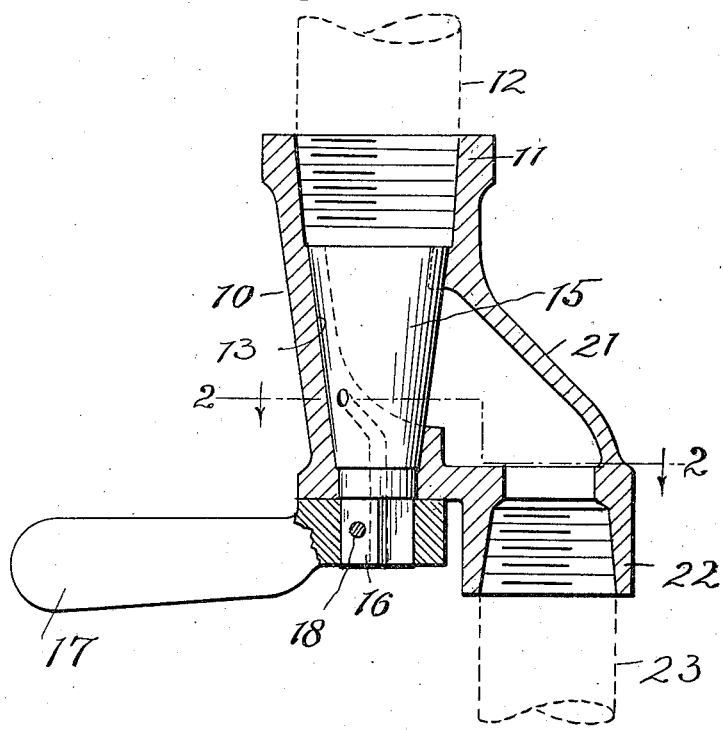
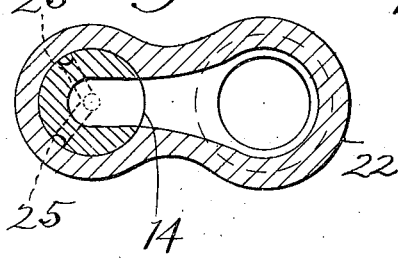
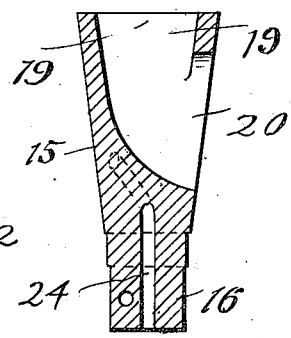
Inventor
Louis W. Greve
by Thurston & Kwis
Attys

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

AIR VALVE.

1,425,643.  Specification of Letters Patent.   Patented Aug. 15, 1922.

Application filed May 23, 1918. Serial No. 236,110.

*To all whom it may concern:*

Be it known that I, Louis W. Greve, a citizen of the United States, residing at Cleveland, in the county of Cuyahoga and State of Ohio, have invented a certain new and useful Improvement in Air Valves, of which the following is a full, clear, and exact description.

This invention relates to a valve adapted particularly as an air valve, and has for its principal object the provision of a valve which is simple in construction, durable and efficient, and one which will remain tight in the sense that the movable valve member will not by reason of wear become loose and permit leakage.

The invention may be briefly summarized as consisting in certain novel details of construction and arrangements of parts which will be described in the specification and set forth in the appended claims.

In the accompanying sheet of drawings, Fig. 1 is a longitudinal sectional view of an air valve embodying my invention, portions of the supply and outlet pipes being shown by dotted lines; Fig. 2 is a cross-sectional view substantially along the irregular line 2—2 of Fig. 1; and Fig. 3 is a longitudinal sectional view of the movable valve member.

The valve embodying my invention comprises a valve body 10 having an inlet end 11 threaded or otherwise appropriately shaped to permit connection with an air supply pipe 12 shown by dotted lines. Directly in line with the inlet end 11, the inner chamber of the valve body is formed into a tapered or conical valve seat 13 having in its side wall an elongated rather narrow port 14. The seat 13 is engaged by a tapered rotary valve 15, the taper of the seat and valve being such that the large end of the valve is toward the inlet end 11. The opposite end 16 of the valve is reduced and extends through a relatively small opening directly opposite, or in line with the opening at the inlet end of the valve body, the reduced end 16 being appropriately shaped to receive a suitable handle or other valve operating member 17 which may be secured in place by a pin 18 or otherwise.

The movable valve member 15 has a passageway 19 extending axially inward from its large end, and then extending laterally to the tapered surface where it is formed into an elongated narrow port 20, the passageway 19 at the large end of the valve being preferably circular and gradually merging into the narrow elongated lateral port 20. As will be obvious, the port 20 in the side wall of the valve member is adapted to be placed in registration with the port 14 in the side wall of the tapered seat to permit air to flow through the valve and to be placed out of registration so as to stop the flow of air by giving the valve member a quarter turn. The two ports 14 and 20 are preferably the same size and correspondingly shaped.

The valve body 10 is provided with a lateral extension 21 with an inner passageway which is adapted to communicate with the passageway leading from the inlet end of the valve body through the port 14, and this extension terminates in an outlet 22, threaded or otherwise appropriately shaped to permit connection with an outlet or air delivery pipe 23, which like the pipe 12 is shown by dotted lines. The outlet 22 is not only displaced laterally from the inlet 11, but the axis of the outlet is parallel, or substantially parallel to the axis of the inlet, but while the parallelism of the axes of the outlet and inlet is preferable, it is not essential. The passageway or chamber in the extension 21 leading to the outlet gradually enlarges or expands from the port 14 to the outlet.

The tapered valve member 15 is preferably provided with waste passageways to permit air to be exhausted from that part of the chamber to which the outlet pipe 23 is connected when the valve is closed, this waste passageway which is shown at 24, extending inwardly from the reduced end of the valve member, and opposite the port 20 being branched and terminating in two spaced ports 25, one of which will be placed in communication with the port 14 and passageway in the extension 21 when the valve is closed. The branching of the waste passageway and the provision of the two ports 25 is for the purpose of permitting waste of air from the outlet side of the valve body when the valve is closed, regardless of whether the valve is turned to the right or to the left in closing.

The simplicity and durability of this valve are believed to be apparent from the drawings, and it will be seen that the valve will remain tightly seated regardless of wear, because the enlarged end of the valve is toward the air inlet or supply pipe so that the pressure of air at all times has a tendency to seat the valve and thus press it firmly against the tapered seat.

It might be explained that the merging of the portions of the inner passageway of the valve in the inlet and outlet sides into the narrow communicating port, and the merging of the relatively large opening at the large end of the valve into the narrow elongated lateral port are to provide ample wall or bearing space to prevent leakage between the port in the valve and the port in the valve body when the valve is turned to closed or off position.

While I have shown the preferred form of my invention, I do not wish to be confined to the precise details shown, but aim in my claims to cover such minor variations or modifications as do not involve a departure from the spirit and scope of my invention in its broadest aspects.

Having described my invention, I claim:

1. A valve comprising a valve body having an inlet end with a portion to which a pipe connection may be made and merging into a tapered valve seat which is in line with said inlet end and is provided with an elongated lateral port, and said valve body having a lateral extension terminating in an outlet end to which a pipe connection may be made, and provided with a passageway which leads from said port and at said port is narrowed and elongated in substantial conformity with the shape of the port, and widening as it approaches the outlet end, and a tapered valve engaging said seat and having its large end toward the inlet end of the valve body and having a reduced operating end projecting from the valve body, said valve having a passageway extending from the large end and a lateral elongated opening adapted to register with said port in the seat.

2. A valve comprising a valve body having an inlet end to which a pipe connection may be made and merging into a tapered valve seat in line with said inlet end, the large part of the seat being toward the inlet, and said valve having a lateral extension terminating in an outlet end to which a pipe connection may be made, the inlet and outlet portions having a narrow elongated communicating port in the tapered valve seat, and a tapered valve engaging said seat with its large end toward the inlet, and with a reduced part projecting from the valve body, said valve having a main passageway from its large end terminating in a narrow elongated lateral outlet port adapted to register with said port in the valve seat, said valve having a waste passageway extending from the reduced end inwardly and terminating in the tapered wall of the valve at one side of the main passageway.

3. A valve comprising a valve body having an inlet end to which a pipe connection may be made and merging into a tapered valve seat in line with said inlet end, the enlarged part of the seat being toward the inlet, and said valve body having a lateral extension terminating in an outlet end whose axis is substantially parallel to the axis of the inlet end, the inlet and outlet portions facing in opposite directions and having a communicating port in the tapered valve seat, and a tapered valve engaging said seat and having a reduced part projecting from the valve body at the side of the outlet end, and said valve member having a waste passageway extending from the reduced end inwardly and then laterally to the tapered wall of the valve.

4. A valve comprising a valve body having an inlet opening and a tapered valve seat in line with said end to which a pipe connection may be made and having a narrow elongated port in its side wall, and said valve body having an outlet portion with a passageway leading from said port and expanding into an outlet opening which is laterally displaced with reference to the inlet opening, the inlet and outlet openings facing in opposite directions and having substantially parallel axes, and a tapered rotary valve engaging said seat and having its large end toward the inlet opening and its small end extending through the valve body and adapted to receive an actuating member, said valve having a passageway extending axially from the large end and converging and terminating in a narrow elongated lateral port in its side of the same size and shape as the first named port adapted to be placed into and out of registration with the first named port.

In testimony whereof, I hereunto affix my signature.

LOUIS W. GREVE.